United States Patent
Lin et al.

(10) Patent No.: US 12,355,847 B2
(45) Date of Patent: Jul. 8, 2025

(54) ENHANCED BROADCAST CONCURRENT OTA FIRMWARE UPGRADE METHOD BASED ON BLUETOOTH MESH

(71) Applicant: Nanjing Silergy Micro Technology Co., Ltd., Nanjing (CN)

(72) Inventors: Chunbo Lin, Nanjing (CN); Jiajie Fu, Nanjing (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 211 days.

(21) Appl. No.: 18/071,823

(22) Filed: Nov. 30, 2022

(65) Prior Publication Data
US 2023/0179668 A1    Jun. 8, 2023

(30) Foreign Application Priority Data
Dec. 3, 2021 (CN) .......................... 202111466448.9

(51) Int. Cl.
*H04L 67/00* (2022.01)
*G06F 8/65* (2018.01)
*H04W 84/18* (2009.01)

(52) U.S. Cl.
CPC .............. *H04L 67/34* (2013.01); *G06F 8/65* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,716,660 B2* | 5/2010 | Mackay | ................. | G06F 8/658 717/169 |
| 8,040,908 B2* | 10/2011 | Choi | ................... | H04W 72/569 370/395.42 |
| 2007/0082621 A1* | 4/2007 | Lee | ....................... | H04W 76/11 370/310 |
| 2007/0248114 A1* | 10/2007 | Jia | ...................... | H04B 1/71632 370/465 |
| 2009/0158273 A1* | 6/2009 | Paul | ......................... | G06F 8/65 717/178 |
| 2009/0328027 A1* | 12/2009 | Tsuchiya | ............... | H04L 43/103 714/47.1 |
| 2011/0182253 A1* | 7/2011 | Shekalim | .............. | H04W 28/18 370/328 |
| 2012/0102478 A1* | 4/2012 | Jeong | .................... | H04W 24/02 717/170 |

(Continued)

*Primary Examiner* — Jason D Mitchell

(57) ABSTRACT

A method of enhanced broadcast concurrent OTA firmware upgrade based on Bluetooth Mesh, can include: creating nodes that meet preset conditions in a Bluetooth Mesh network into a group; selecting a root source node from the group, and performing OTA firmware upgrade for the root source node; distributing, by the root source node, OTA firmware upgrade data packets to target nodes that have not completed the upgrade in the group, based on an extended broadcast message; obtaining, by the root source node, OTA firmware upgrade status information of the target nodes in the group; and determining, by the root source node, whether to redistribute the OTA firmware upgrade data packets or respond to the request for retransmission of missing data packets, based on the OTA firmware upgrade status information.

20 Claims, 5 Drawing Sheets

(56) References Cited

U.S. PATENT DOCUMENTS

| | | | | |
|---|---|---|---|---|
| 2014/0269487 A1* | 9/2014 | Kalkunte | ................ | H04L 45/16 |
| | | | | 370/312 |
| 2017/0339224 A1* | 11/2017 | Condeixa | ............. | H04W 4/029 |
| 2018/0097690 A1* | 4/2018 | Yocam | ................. | H04L 41/082 |
| 2019/0138295 A1* | 5/2019 | Agerstam | ................ | G06F 8/65 |
| 2019/0303130 A1* | 10/2019 | M. Saeed | ................ | H04W 4/80 |
| 2020/0104115 A1* | 4/2020 | Tomasini | ................ | H04W 4/33 |
| 2021/0075549 A1* | 3/2021 | Bastani | ................ | H04L 1/1809 |
| 2021/0336797 A1* | 10/2021 | Van Duren | ............ | H04L 9/3263 |
| 2022/0283796 A1* | 9/2022 | McFarland, Jr. | ....... | H04W 4/44 |
| 2022/0385400 A1* | 12/2022 | Sun | ............................ | G06F 8/65 |
| 2023/0139509 A1* | 5/2023 | Landman | ................ | G06F 21/64 |
| | | | | 717/168 |
| 2023/0261938 A1* | 8/2023 | Griffin | ...................... | G06F 8/65 |
| | | | | 709/220 |
| 2024/0095019 A1* | 3/2024 | Han | ........................ | G06F 8/654 |
| 2024/0184648 A1* | 6/2024 | He | .......................... | G06F 9/546 |

\* cited by examiner

ENHANCED BROADCAST CONCURRENT OTA FIRMWARE UPGRADE METHOD BASED ON BLUETOOTH MESH

RELATED APPLICATIONS

This application claims the benefit of Chinese Patent Application No. 202111466448.9, filed on Dec. 3, 2021, which is incorporated herein by reference in its entirety.

FIELD OF THE INVENTION

The present invention generally relates to the field of Over the Air (OTA) firmware upgrades, and in particular to enhanced broadcast concurrent OTA firmware upgrade methods based on Bluetooth Mesh.

BACKGROUND

OTA is a value-added service based on short message mechanism, which can dynamically download, delete, and update the service menu in SIM card through mobile phone terminal or server (online), such that users can obtain personalized information services. It is a technology for remote management of SIM card data and application programs through the air interface of mobile communication. With the application of OTA technology, mobile communication may not only provide voice and data services, but also new service downloads.

DETAILED DESCRIPTION

Figure 1:
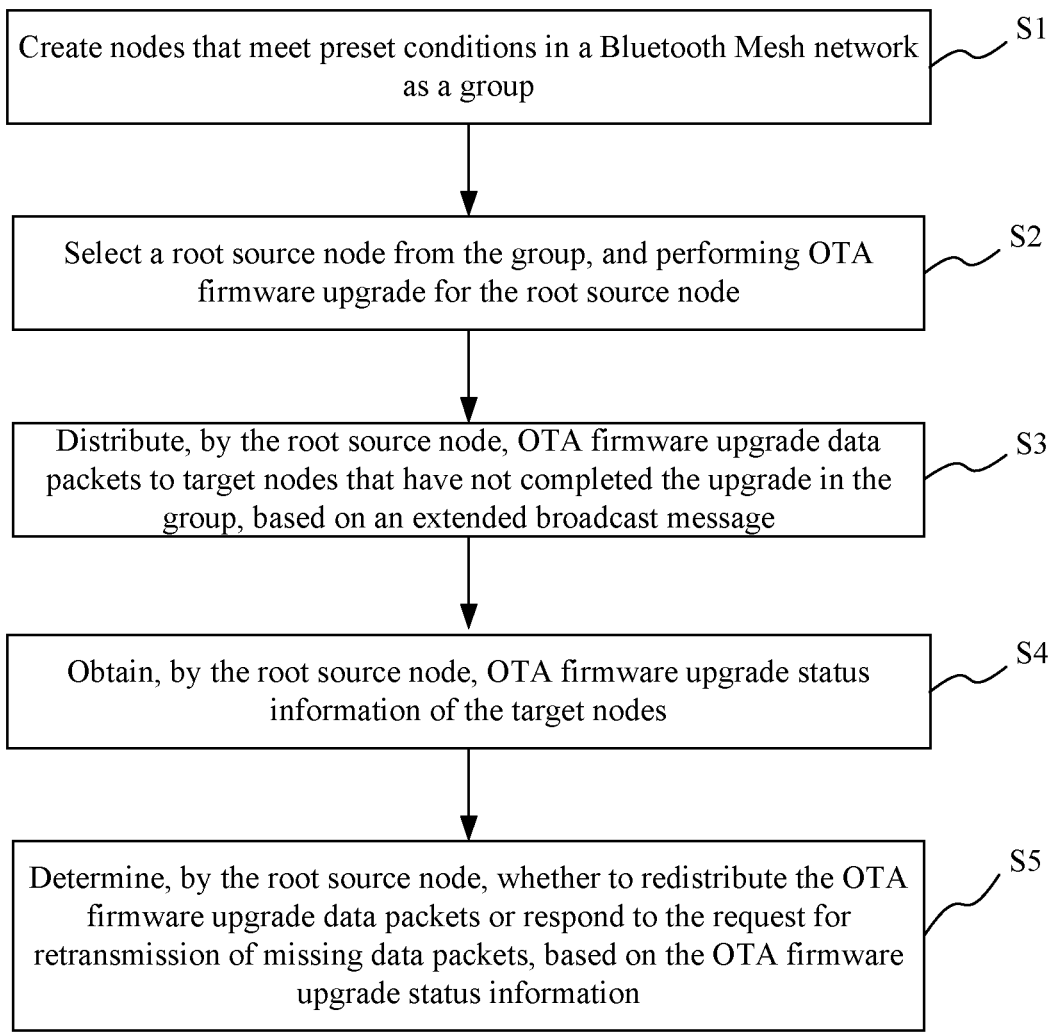
FIG. 1 is a flow chart of an example enhanced broadcast concurrent OTA firmware upgrade method based on Bluetooth Mesh, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The OTA upgrade function can detect whether there is a new system that can be upgraded online, and download the system upgrade package through WiFi wireless network or mobile phone network to complete the upgrade. One approach of an OTA upgrade method based on SIG MESH can include the following steps: OTA client initiates a synchronous command to start the upgrade; after receiving the synchronization command, OTA server judges whether it needs to be upgraded or not, and if so, it switches to the upgrade mode; OTA client starts sending firmware after delaying for a period of time after initiating the synchronization command; OTA server receives firmware; OTA server judges whether the upgrade is completed, and if so, it sends the upgrade success information to OTA client; if packet loss occurs, apply to OTA client for differential retransmission; and after all OTA servers have been upgraded, the upgrade process is ended. However, this approach has the following shortcomings including the development and implementation of OTA Layer in the network layer being relatively simple, which may not meet the consistency of the mesh protocol and has the potential risk of protocol conflict. Among them, OTA Layer in the network layer only has network layer encryption, so it may not be encrypted in the application layer for mesh network, which reduces the security. In addition, the error of the adopted differential retransmission method easily leads to the crash of OTA firmware upgrade, and the throughput is decreased instead.

In another approach, an Internet of Things (IOT) gateway can upgrade network nodes in batches by OTA. In this approach, a gateway for batch upgrade is added, and the gateway coordinates the upgrade behavior of each node to upgrade network nodes in batch. However, this method has shortcomings including that it only records that the gateway queries the remote server to obtain the upgrade file, but does not specify how to complete the node upgrade through the gateway. Also, for the lightweight Bluetooth mesh network, adding gateways may increase the overall cost and network complexity.

When the firmware of the device is updated by OTA, if the data cannot be protected strongly, the data in the air can be easily stolen and tampered by intruders, and the upgrade process is likely to fail, and even more seriously, the device will be hijacked by attackers with disastrous consequences. Security features are mandatory in Bluetooth networks in order to prevent unsafe networks from being used in application programs. Each device added to the network must provide security keys for all networks, application programs and device management operations, and each data packet sent in Bluetooth Mesh network must be authenticated, encrypted and confused. Bluetooth Mesh network uses two-layer security model, namely network layer security and application layer security. Network layer security is used to verify and encrypt all communications in Bluetooth Mesh network and all nodes participating in the network. Application layer security is used to authenticate and encrypt all application layer communications. The strong security system of Bluetooth Mesh network can resist all kinds of intruders' attacks, so OTA firmware upgrade using Bluetooth Mesh protocol can ensure the safe transmission of data in the network.

In particular embodiments, an OTA firmware update model is established according to the Bluetooth Mesh model specification based on the Bluetooth Mesh protocol, and the concurrent upgrade of nodes in the network is realized by broadcasting and distributing data. OTA update model is at the top level of Bluetooth Mesh network protocol architecture, so it can make use of the security features of Bluetooth Mesh network layer and application layer to provide security, without developing new security technologies. In addition, particular embodiments may expand the payload of the broadcast packet in Bluetooth Mesh 1.0 protocol, so it is necessary to analyze and demonstrate whether the expanded broadcast packet is compatible with the original Mesh security features.

For analysis of the security characteristics of Bluetooth Mesh network after the extended broadcast packet, two main aspects can be considered. First, as to the security system: since the extended broadcast message is only used for the transmission of unsegmented data messages of OTA update model, and the control message of OTA update model still adopts the original message format, the extended broadcast message will not affect the security rules and algorithms such as key generation, distribution and key update of Bluetooth Mesh network, and the original security feature scheme still meets the compatibility requirements. Second, as to data authentication and encryption: the two key security functions used in Bluetooth Mesh protocol stack are AES-CMAC and AES-CCM, which are basic encryption and authentication functions. All key generation and data authentication encryption in Bluetooth Mesh network can be based on the above two aspects. The above algorithm may have no limit on the length of input data, and can provide the same strength of security encryption and authentication protection even for the data packets with extended OTA firmware upgrade broadcast data length.

AES-CMAC is a cipher-based message authentication code (CMAC) algorithm, which can generate a message authentication value with a fixed length of 128-bit and use it for any variable length input. The formula of message authentication code MAC generated by AES-CMAC algorithm is: MAC=AES-CMAC$_k$(m), where the input parameter k is a 128-bit key and m is variable-length data to be authenticated. The 128-bit message authentication value with parameter MAC is output.

AES-CCM is a general and authenticated encryption algorithm, which requires encrypted block ciphers when it is used. In the Bluetooth Mesh specification, AES-CCM can be used as the basic encryption and authentication function in all cases, and its usage formula is as follows: ciphertext, MIC=AES-CCM$_k$(n,m), where the input parameter k is a 128-bit key, n is a 104-bit random number, and m is variable-length data to be encrypted and authenticated; The output parameter is ciphertext, and encrypted variable-length data, and MIC is the message integrity check value. The OTA firmware update model based on Bluetooth Mesh of the present invention can include the following contents. For OTA firmware update states, including the following information, Firmware Information, the message structure can be as follows:

| Field | Size(Octets) | Description |
| --- | --- | --- |
| Company ID | 2 | Company identifier of the supplier |
| Product ID | 2 | Product identifier of the supplier |
| Firmware ID | 2*N | Identifier of the current firmware |
| Firmware Version | 2*N | Version of the current firmware |

For Firmware Process Status, the message structure can be as follows:

| Value | Description |
| --- | --- |
| 0x00 | Upgrade is not complete. |
| 0x01~0x09 | Percentage of upgraded nodes |
| 0x0A | All upgrades are complete. |
| 0xFF | Unknown state |
| 0x0B~0xFE | Forbidden |

For OTA Update Messages, OTA Update information Get, which is a message used to obtain the current firmware information of the node, whereby the response is a message of OTA Update information Status, the message may have no parameters. For OTA Update information Status, which is a message used to report the current firmware information of the node, the message structure can be as follows:

| Field | Offset | Size(Octets) | Description |
| --- | --- | --- | --- |
| Company ID | 0 | 2 | Company identifier of the supplier |
| Product ID | 2 | 2 | Product identifier of the supplier |
| Application ID | 4 | 2 | Identifier of the current application firmware |
| Application Version | 6 | 2 | Version of the current application firmware |
| High Mesh ID | 8 | 2 | Identifier of the current Model Layer, Foundation Model Layer and Access Layer integrated firmware |
| High Mesh Version | 10 | 2 | Version of the current Model Layer, Foundation Model Layer and Access Layer integrated firmware |
| Middle Mesh ID | 12 | 2 | Identifier of current Upper Transport Layer and Low Transport Layer integrated firmware |
| Middle Mesh Version | 14 | 2 | Version of the current Upper Transport Layer and Low Transport Layer integrated firmware |
| Low Mesh ID | 16 | 2 | Identifier of current Network Layer and Bearer Layer integrated firmware |
| Low Mesh Version | 18 | 2 | Version of current Network Layer and Bearer Layer integrated firmware |
| BLE FW ID | 20 | 2 | Identifier of current BLE protocol stack firmware |
| BLE FW Version | 22 | 2 | Version of the current BLE protocol stack firmware |

For OTA Update Complete Get, which is a message used to obtain the upgrade status information of the node, and the response is the message of OTA Update Complete Status, the message may have no parameters. For OTA Update Complete Status, which is a message used to report the current OTA firmware upgrade status information of the node, and the message structure can be as follows:

| Field | Offset | Size(Octets) | Description |
| --- | --- | --- | --- |
| Status | 0 | 1 | 0x00: Upgrade is not completed. 0x0A: Upgrade is complete. 0x0B: Not upgraded 0x: Unknown status |

-continued

| Field | Offset | Size(Octets) | Description |
|---|---|---|---|
| Priority | 1 | — | 0x00: High<br>0x01: Middle<br>0x02: Low<br>0x03: Best effort |

For OTA Update Complete Set, which is a message used to set the node update complete status information, and the response is the message of OTA Update Generic Status, the following message structure can be as follows:

| Field | Offset | Size(Octets) | Description |
|---|---|---|---|
| Address | 0 | 2 | Unicast address of the node |
| Status | 2 | 1 | 0x00: The upgrade is not complete.<br>0x0A: Upgrade is complete.<br>0x0B: Not upgraded<br>0x: unknown status |
| Priority | 3 | 1 | 0x00: High<br>0x01: Middle<br>0x02: Low<br>0x03: Best effort |

For OTA Update Start Unacknowledged, which is a message used to announce the start of OTA Update to the node and inform the related parameters of OTA Update, the message structure can be as follows:

| Field | Offset | Size(Octets) | Description |
|---|---|---|---|
| Public Mode | 0 | 1 | 0x00: Unicast mode<br>0x01: Multicast mode<br>0x: broadcast mode |
| Firmware ID Flag | 1 | 1 | 1: exist; 0: none<br>Bit0: BLE FW;<br>Bit1: Low Mesh;<br>Bit2: Middle Mesh;<br>Bit3: High Mesh;<br>Bit4: Application;<br>Other: RFU |
| Firmware ID | 2 | 2*N | Identifier of the corresponding firmware |
| Firmware Version | — | 2*N | Version number of the corresponding firmware |
| Firmware Size | — | N | Size of corresponding firmware |
| Firmware Base Address | — | 4*N | The starting address of the corresponding firmware storage |
| Block number | — | 2 | Number of blocks of data sending the firmware |
| Block Length | — | 1 | The length of each block |
| ADV Counts | — | 1 | The number of times for repeat broadcasting of each block |
| ADV Turns | — | 1 | The number of rounds of broadcasting complete firmware data |

For OTA update end unknown, this is a message used to announce the end of the broadcast distributed OTA firmware upgrade. For OTA Update Abort or Cancel Set, which is a message used to abort the OTA firmware upgrade process of the whole network or a node, and the response is the message of OTA Update Generic Status, the message structure can be as follows:

| Field | Offset | Size(Octets) | Description |
|---|---|---|---|
| Abort Mode | 0 | 1 | 0x00: Abort the upgrade of a single node and clear the cache<br>0x01: Pause the upgrade of a single node and keep the cache<br>0x02: Abort the network upgrade and clear the cache<br>0x03: Suspend network upgrade and keep cache |
| Node Address | 1 | 2 | Unicast address of node |

For OTA Update Block Transfer Unacknowledged, which is a message used to transfer firmware data to unicast nodes or multicast nodes in the network, the message structure can be as follows:

| Field | Offset | Size(Octets) | Description |
|---|---|---|---|
| Firmware ID | 0 | 2 | Identifier of firmware |
| Block Index | 2 | 2 | Index of firmware data block |
| Block Length | 4 | 1 | Length of firmware data block |
| Block Data | 5 | 220 | Payload of Firmware data block |

For OTA Update Missing Block Get, which is a message used to request the missing Block, and the response is the message of OTA Update Block Status, the message structure can be as follows:

| Field | Offset | Size(Octets) | Description |
|---|---|---|---|
| Firmware ID | 0 | 2 | Identifier of firmware |
| Priority | 2 | 1 | 0x00: High<br>0x01: Middle<br>0x02: Low<br>0x03: Best effort |
| Missing Block Index | 3 | 2 | Index of missing data block |

For OTA Update Missing Block Status, which is used to respond to the message of OTA Update Missing Block Get, the message structure can be as follows:

| Field | Offset | Size(Octets) | Description |
|---|---|---|---|
| Firmware ID | 0 | 2 | Identifier of firmware |
| Block Index | 2 | 2 | Index of firmware data block |
| Block Length | 4 | 1 | Length of firmware data block |
| Block Data | 5 | 220 | Firmware data block payload |

For OTA Update Missing Block Map Get, which is a message used to request the missing Block, and the response is the message of OTA Update Generic Status, the message structure can be as follows:

| Field | Offset | Size(Octets) | Description |
|---|---|---|---|
| Firmware ID | 0 | 2 | Identifier of firmware |
| Priority | 2 | 1 | 0x00: High<br>0x01: Middle<br>0x02: Low<br>0x03: Best effort |
| Missing Chunk Map | 3 | 8 | 8 groups of blocks form a chunk, and each Bit indicates whether there is a missing Index in the chunk. 1 represents missing, and 0 represents normal. |

-continued

| Field | Offset | Size(Octets) | Description |
|---|---|---|---|
| Missing Block Map | 11 | 64 | Each Bit represents a Block Index, 1 represents missing, and 0 represents normal. |

For OTA Update Burst Transfer Start, which is a message used to start the missing Block burst transmission, and the response is the message of OTA Update Burst Transfer Status, the message structure can be as follows:

| Field | Offset | Size(Octets) | Description |
|---|---|---|---|
| Burst Time | 0 | 2 | Request reserved burst transmission time |

For OTA Update Burst Transfer End, which is a message used to end the missing Block burst transmission, and the response is the message of OTA Update Burst Transfer Status, the message may have no parameters. For OTA update Burst Transfer status, which is a message used to respond to the Burst Transfer message, the message structure can be as follows:

| Field | Offset | Size(Octets) | Description |
|---|---|---|---|
| Opcode | 0 | 3 | OTA Update Burst Transfer Start OTA Update Burst Transfer End |
| Burst Time | 3 | 2 | Response to the burst transmission time 0xFFFF: invalid |
| Missing Chunk Map Update | 2 | 8 | 8 groups of Blocks form a chunk, and each Bit indicates whether there is a missing Index in the chunk. 1 represents missing, and 0 represent normal. OTA Update Burst Transfer End is valid. |
| Missing Block Map Update | 10 | 64 | Each Bit represents a Block Index, 1 represents missing, and 0 represents normal. OTA Update Burst Transfer End is valid. |

For OTA Update Generic Status, which is a message used to return the OTA Update message operation status, the message structure can be as follows:

| Field | Offset | Size(Octets) | Description |
|---|---|---|---|
| Status | 0 | one | 0x00: operate successful |

For Models definitions, the mapping relationship between roles and models can be as follows:

| Role | Models |
|---|---|
| Initiating node | OTA Update Client |
| Source node | OTA Update Server; OTA Update Client |
| Target node | OTA Update Server; OTA Update Client |

An OTA Update Server can have the following structure:

| Element | SIG Model ID | States | Messages | Rx | Tx |
|---|---|---|---|---|---|
| Main | 0x053F0000 | Firmware Information | OTA Update information Get | M | |
| | | | OTA Update information Status | | M |
| | | Firmware Update Process Status | OTA Update Complete Get | M | |
| | | | OTA Update Complete Status | | M |
| | | | OTA Update Complete Set | | M |
| | | | OTA Update Start Unacknowledged | M | |
| | | | OTA Update End Unacknowledged | M | |
| | | | OTA Update Abort or Cancel Set | M | |
| | | | OTA Update Block Transfer Unacknowledged | M | |
| | | | OTA Update Missing Block Get | | M |
| | | | OTA Update Missing Block Status | M | |
| | | | OTA Update Missing Block Map Get | | M |
| | | | OTA Update Burst Transfer Start | M | |
| | | | OTA Update Burst Transfer End | M | |
| | | | OTA Update Burst Transfer Status | | M |
| | | | OTA Update Generic Status | M | M |

An OTA Update Client can have the following structure:

| Element | SIG Model ID | States | Messages | Rx | Tx |
|---|---|---|---|---|---|
| Main | 0x053F0001 | Firmware Information | OTA Update information Get | | M |
| | | | OTA Update information Status | M | |
| | | Firmware Update Process Status | OTA Update Complete Get | | M |
| | | | OTA Update Complete Status | M | |
| | | | OTA Update Complete Set | M | |
| | | | OTA Update Start Unacknowledged | | M |
| | | | OTA Update End Unacknowledged | | M |
| | | | OTA Update Abort or Cancel Set | | M |
| | | | OTA Update Block Transfer Unacknowledged | | M |
| | | | OTA Update Missing Block Get | M | |
| | | | OTA Update Missing Block Status | | M |
| | | | OTA Update Missing Block Map Get | M | |
| | | | OTA Update Burst Transfer Start | | M |
| | | | OTA Update Burst Transfer End | | M |
| | | | OTA Update Burst Transfer Status | M | |
| | | | OTA Update Generic Status | M | M |

A summary of opcodes can be as follows:

| Model | Message name | Opcode |
|---|---|---|
| OTA Update Model | OTA Update information Get | 0xE0 0x053F |
| | OTA Update information Status | 0xE1 0x053F |
| | OTA Update Complete Get | 0xE2 0x053F |
| | OTA Update Complete Status | 0xE3 0x053F |
| | OTA Update Complete Set | 0xE4 0x053F |
| | OTA Update Start Unacknowledged | 0xE5 0x053F |
| | OTA Update End Unacknowledged | 0xE6 0x053F |
| | OTA Update Abort or Cancel Set | 0xE7 0x053F |
| | OTA Update Block Transfer Unacknowledged | 0xE8 0x053F |
| | OTA Update Missing Block Get | 0xE9 0x053F |
| | OTA Update Missing Block Status | 0xEA 0x053F |
| | OTA Update Missing Block Map Get | 0xEB 0x053F |
| | OTA Update Burst Transfer Start | 0xEC 0x053F |
| | OTA Update Burst Transfer End | 0xED 0x053F |
| | OTA Update Burst Transfer Status | 0xEE 0x053F |
| | OTA Update Generic Status | 0xEF 0x053F |

Figure 2:
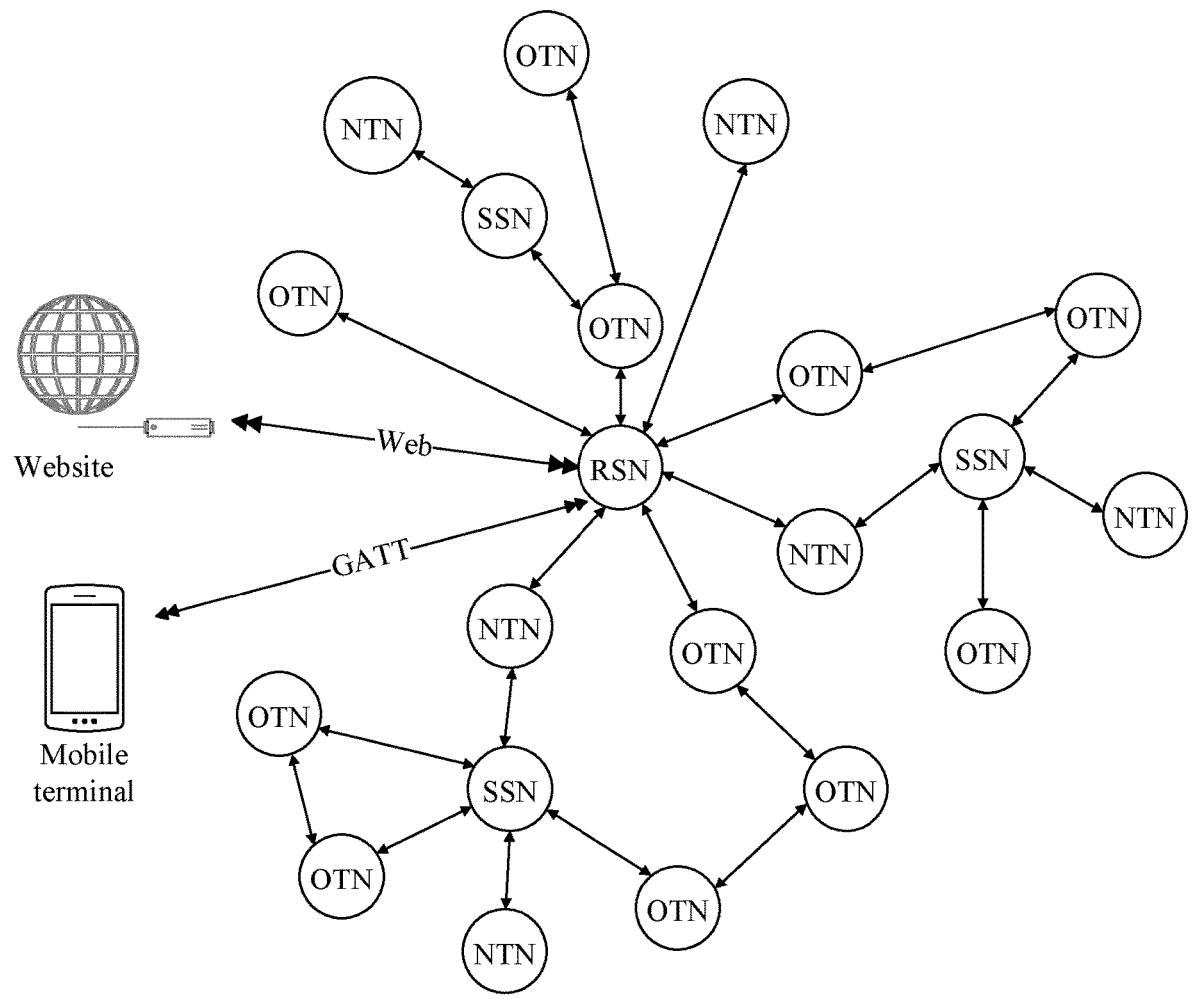
FIG. 2 is a schematic frame diagram of an example enhanced broadcast concurrent OTA firmware upgrade method based on Bluetooth Mesh, in accordance with embodiments of the present invention.

Referring now to FIGS. 1 and 2, shown are flow chart and schematic frame diagram of an example enhanced broadcast concurrent OTA firmware upgrade method based on Bluetooth Mesh, in accordance with embodiments of the present invention. In one example, the enhanced broadcast concurrent OTA firmware upgrade method based on Bluetooth Mesh can include the following steps. In S1, the nodes in the Bluetooth Mesh network that meet the preset conditions can be created as one group.

For example, the Provisioner may respectively provision all Bluetooth Mesh devices with network access operations. The provisioner can create nodes that meet the preset conditions as one group, and upgrade OTA firmware together. The provisioner may provide configuration data for the unconfigured Bluetooth Mesh device that allows it to become a node in the Bluetooth Mesh network, including a network key, current initial vector index IV Index, and unicast address of each element. The provisioner may add the nodes with the same manufacturer identifier (CID) and the same product identifier (PID) to the same group address, thus helping to address the nodes that subscribe to OTA firmware upgrade with the same group address. Due to the limited number of multicast addresses, virtual addresses can be used instead of multicast addresses in order to prevent conflicts with group addresses used by other manufacturers.

In S2, a Root Source Node (RSN) can be selected from the group to upgrade OTA firmware for the RSN. RSN may be used as the initiator of OTA firmware upgrade in Bluetooth Mesh network. RSN should be a Mesh node which is arranged in the center of Bluetooth Mesh network and has complete functional characteristics, and can directly communicate with other nodes. The advantages of RSN selected by the above principles are as follows. It has no "hidden" effect on other nodes in the network, and it can reduce the hop count of the node relay as far as possible, in order to improve the success rate of message delivery and reduce the conflict and interference. In addition, RSN may also have functions of processing and responding to OTA request messages from other nodes, and controlling and managing the firmware upgrade of Mesh OTA.

For example, when the RSN has the Bluetooth gateway function, any of the following ways is used to upgrade the OTA firmware of the RSN. The RSN may perform OTA firmware upgrade by BLE GATT (Generic Attribute Profile) based on the mobile terminal device. The mobile terminal device, as a startup node, can send a message of OTA Update information Get to the RSN to obtain the OTA firmware upgrade parameters of the RSN, and the RSN returns a message of OTA Update information Status to the startup node. The startup node may determine whether to upgrade OTA firmware and to upgrade OTA firmware in whole or in sections according to the message of OTA Update information Status. When it is determined that the RSN needs OTA firmware upgrade, the startup node can establish a connection with the RSN, and may send OTA firmware upgrade data to the RSN one by one through GATT. Then, the RSN can decrypt and verify the OTA firmware upgrade data according to the OTA firmware upgrade data to complete the OTA firmware upgrade.

When distributing OTA firmware upgrade data to the RSN, a segmented firmware upgrade technology can be adopted. For example, the Bluetooth Mesh firmware can include a low-power Bluetooth protocol stack, a Bluetooth Mesh protocol stack, and application programs, which can add up to hundreds of kilobytes. Generally, only the part of the application programs may be modified, and most firmware functions may remain unchanged. If all the upgrades are made by OTA every time, this can take a huge amount of time and resources. Therefore, it may be necessary to split and classify the firmware to achieve segmented firmware upgrade.

Figure 3:
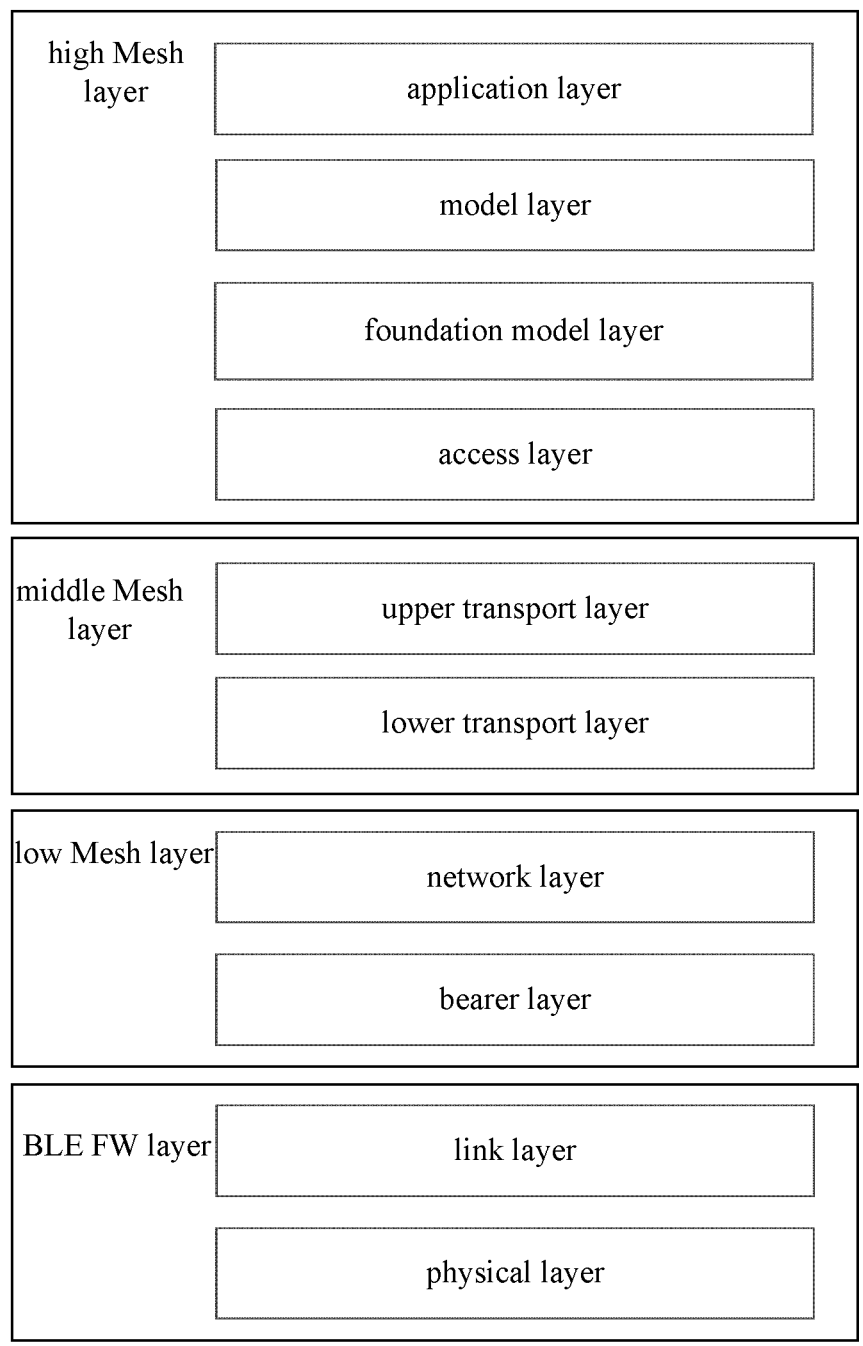
FIG. 3 is a schematic block diagram of an example OTA firmware, in accordance with embodiments of the present invention.

Referring now to FIG. 3, shown is a schematic block diagram of an example OTA firmware, in accordance with embodiments of the present invention. In this particular example, the Bluetooth Mesh firmware is divided into four parts, namely, the high Mesh layer, the middle Mesh layer, the low Mesh layer, and the Bluetooth firmware layer (BLE FW layer). Each part has identification information and version information. During an OTA update, only the firmware information can be compared to selectively complete some firmware updates. For example, the high Mesh layer can include application layer, model layer, foundation model layer, and access layer. The middle Mesh layer can include an upper transport layer and a lower transport layer. The low Mesh layer can include a network layer and a bearer layer. The BLE FW layer can include a link layer and a physical layer.

The RSN can request OTA firmware upgrade data from the OTA firmware upgrade website by the preset period, and may obtain the OTA firmware upgrade data based on the network transmission mode to complete the OTA firmware upgrade. In S3 (see, e.g., FIG. 1), the RSN may distribute OTA firmware upgrade data packets to OTNs in the group based on the extended broadcast message. For example, after completing the OTA update, the RSN can utilize the extended broadcast message to distribute the OTA firmware upgrade data to the multicast address or virtual address in the Bluetooth Mesh network. The nodes in the multicast address or the virtual address may have the same manufacturer and the same product identifier, and the nodes may receive OTA firmware upgrade data distributed by the RSN in a group address subscription mode.

The OTN (Old Target Node) may refer to the target node in the network that needs OTA firmware upgrade but has not completed the upgrade yet. The OTN can receive the OTA firmware upgrade data message marked as new in the network by subscription until the upgrade operation is completed. The OTN may also send a message of OTA_RESENT_REQ to the RSN or the node with the RSN function. In particular embodiments, the distribution of OTA firmware upgrade data packets by the RSN to the OTNs in the group based on the extended broadcast message can include the following steps.

The RSN can issue an update start instruction to the group many times in a multicast way to inform the OTNs to prepare for the upgrade. The RSN may issue a message of OTA Update Start Unacknowledged to the Bluetooth Mesh network in a multicast way, in order to send OTA firmware upgrade parameters and OTA firmware upgrade reminders to the OTNs. To ensure that all nodes in the network receive the above messages, the RSN can send the message of OTA Update Start Unacknowledged to the network many times, and the specific sending frequency and quantity may be adjusted according to the node density and network topology in Bluetooth Mesh network.

For a small Bluetooth Mesh network with only dozens of nodes, the time spent on updating and upgrading them one by one using GATT connection may be acceptable. The advantage of the connection mode is that the data transmission is more reliable. However, for a medium and large Bluetooth Mesh network with hundreds of nodes, it takes longer time for serial upgrade one by one due to the large number of nodes in the network. In addition, due to the limitation of power consumption, there may be incomplete functional nodes in the network that do not have the connection function, and the connection mode cannot use the characteristics of Bluetooth Mesh, which can lead to the blind spot of upgrade and make it impossible to complete the upgrade of the whole network. To solve this problem, the broadcast way can be utilized to perform the concurrent OTA firmware upgrade. The broadcast upgrade method is compatible with Bluetooth Mesh network protocol. By using features such as Mesh relay, messages can be quickly transmitted to all devices in the network. This method is much faster than passing the whole firmware to each device separately.

The RSN can send the OTA firmware upgrade data packets to the OTNs, and may send the update end instruction at the end, in order to inform the OTNs of the completion of the transmission. The RSN can issue a message of OTA Update Block Transfer Unacknowledged to send OTA firmware upgrade data to the OTNs in the Bluetooth Mesh network. The OTN can decrypt and verify the OTA firmware upgrade data by using the application key, and may judge whether the OTA firmware upgrade data points to the group address of the OTN. If so, it can receive the OTA firmware upgrade data until the message of OTA Update End Unacknowledged issued by the RSN is received to indicate that the OTA firmware upgrade data has been published.

The message of OTA Update Block Transfer Unacknowledged can adopt a broadcast message expanded to 255 bytes to improve the throughput and shorten the upgrade time. The extended broadcast message may be compatible with the frame formats of different protocol layers of Bluetooth Mesh protocol stack. Because the RSN transmits the binary OTA firmware upgrade data to the nodes in the network in an unresponsive way, the loss may occur in the transmission process. In order to maximize the reliability of transmission, three aspects can be considered for the RSN: increasing the number of broadcast messages sent in each group, reducing the sending interval of broadcast messages, and increasing the number of rounds of the data transmission for the whole OTA firmware upgrade. As the nodes in Bluetooth Mesh network have a relay function, frequent sending of messages may lead to network flooding and reduce transmission efficiency, so the parameter adjustment of OTA firmware upgrade data sent by the RSN may be compromised according to node density, node span, network topology, and other aspects.

Bluetooth Mesh network may utilize Bluetooth 4.0 physical layer and link layer for communication, which means that Bluetooth Mesh network can be realized by adding necessary software layer on top of any radio that conforms to Bluetooth 4.0 low-power standard. The broadcast packet of Bluetooth 4.0 can only carry 31 Bytes of valid data at most, and the remaining payload can be only a dozen bytes excluding the protocol headers of all layers in Bluetooth Mesh protocol, which may be insufficient for applications that need a large throughput. Usually, OTA firmware upgrade data in Bluetooth Mesh network often reaches hundreds of kilobytes. Using Bluetooth 4.0 to broadcast and distribute data will cause serious data segmentation, and the wireless network will become very congested, and the low throughput will greatly affect the time of device firmware upgrade.

In 2017, Bluetooth SIG organization released mesh version 1.0 based on Bluetooth 4.0. At present, the Bluetooth protocol has developed to generation 5.0, and more and more new features have been added. The mesh protocol based on Bluetooth 4.0 has become increasingly difficult to meet new application requirements. In order to improve and solve the OTA firmware upgrade problem of the current Bluetooth Mesh network, it is also necessary to make full use of the characteristics of Bluetooth Mesh protocol and the operational compatibility with existing Bluetooth Mesh devices. Therefore, the invention expands the payload length of the broadcast physical channel data packets in Bluetooth 4.0 from 31 Bytes to 249 Bytes, while retaining the original broadcast physical channel data packets in the protocol, so it can be compatible with Bluetooth Mesh 1.0 protocol, and the data throughput is increased by 8 times, the wireless interference caused by network flooding is reduced, and the OTA firmware upgrade speed of Bluetooth Mesh network is increased.

Figure 4:
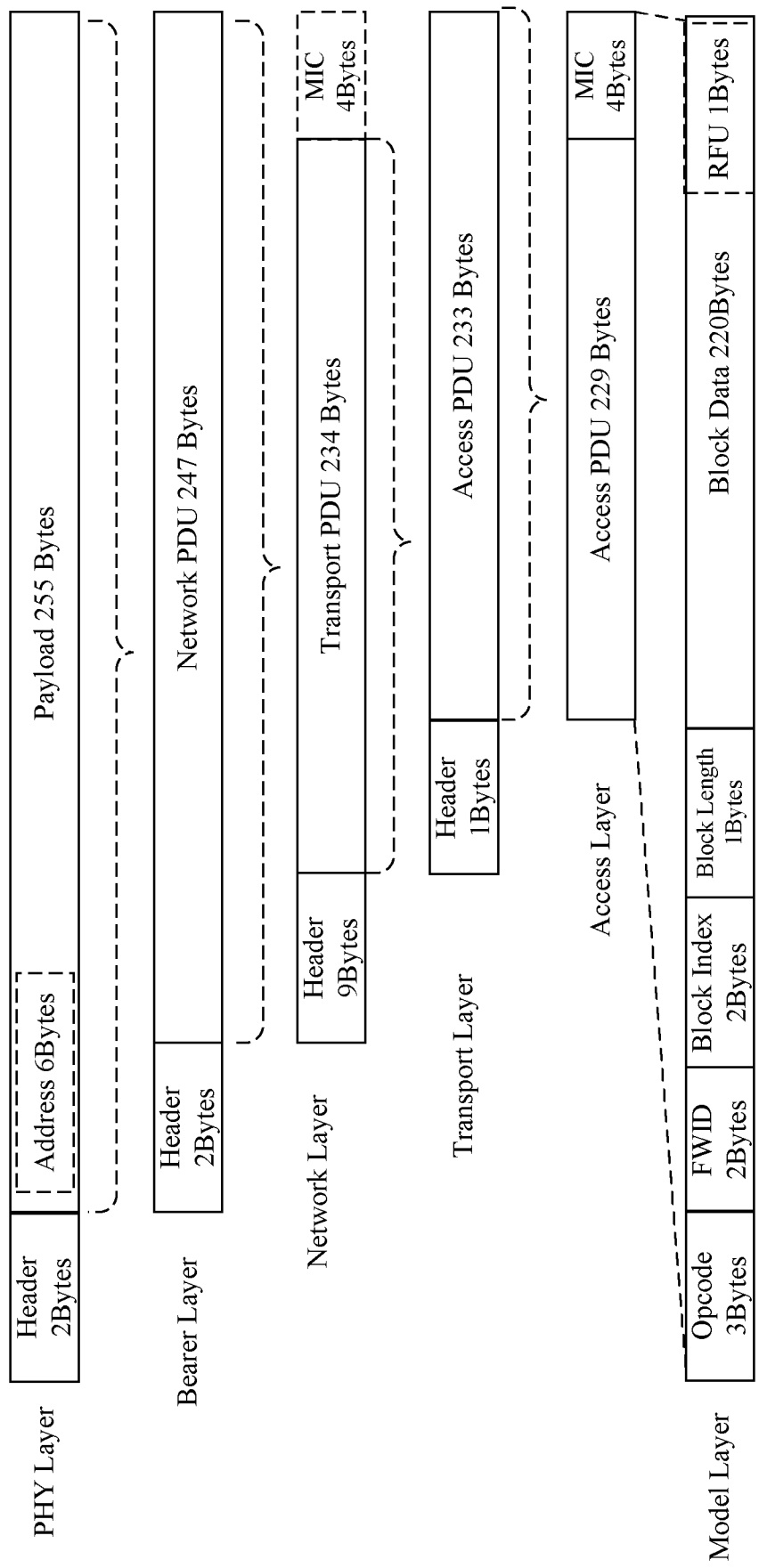
FIG. 4 is a schematic diagram of the structure of an extended broadcast message, in accordance with embodiments of the present invention.

Because the messages of different layers in Bluetooth Mesh network protocol stack have different data formats, when the broadcast message load of the physical layer is expanded, it will inevitably affect the data format and processing flow of the upper layer. If this kind of influence is incompatible with Bluetooth Mesh network protocol, and the powerful functions provided by Bluetooth Mesh protocol cannot be used to improve the performance, then the expansion of physical layer broadcast message will be more than the gain. The structure of the extended broadcast message is shown in FIG. 4. After the physical layer broadcast message is expanded, it can still be compatible with the original protocol specification, and the network performance and functions are further enhanced.

In S4 of FIG. 1, the RSN may obtain the OTA firmware upgrade status information of the OTNs in the group. For example, after the RSN releases the OTA firmware upgrade data, the OTN starts to send a message containing the OTA firmware upgrade status information of its own node to the RSN. The RSN counts OTA firmware upgrade status information of nodes in the group address. The nodes that are not counted can send out inquiry messages in turn. After receiving the message, the node may respond to the RSN with its own OTA firmware upgrade status information until the RSN sends the successful reception response information to the OTN.

For example, the RSN can issue the message of OTA Update End Unacknowledged indicating that OTA firmware upgrade data has been released, and the OTN sends the message of OTA Update Complete Set indicating that the update is completed to the RSN after receiving the message of OTA Update End Unacknowledged, where the message of OTA Update Complete Set can include OTA firmware upgrade status information. Then, the RSN may send a successful response message to the OTN, and the OTN stops sending the message of OTA Update Complete Set.

The RSN can count OTA firmware upgrade status information of each OTN according to a preset period. The OTN with OTA firmware upgrade status information not being counted, may send the message of OTA Update Complete Get to actively inquire about the upgrade status of the node. After receiving the message, the node can immediately respond to the RSN with its own firmware OTA upgrade status information. In S5 of FIG. 1, the RSN may determine to redistribute the OTA firmware upgrade data packet or respond to the request for retransmission of the missing data packets, based on the OTA firmware upgrade status information.

For example, after the RSN completes the upgrade status statistics of all nodes in the group address, it can decide to redistribute the OTA firmware upgrade data or respond to the request for retransmission of the missing data packets according to the node upgrade status obtained from the statistics. In particular embodiments, the process that the RSN determines to redistribute the OTA firmware upgrade data packet or respond to the request for retransmission of the missing data packets based on the OTA firmware upgrade status information can include the following steps.

The RSN can obtain the current OTA firmware upgrade success rate 'Rate' according to the ratio of the number of successfully upgraded nodes in the group to the number of all nodes upgrading OTA firmware. The RSN may determine to redistribute the OTA firmware upgrade data packet or respond to the request for retransmission of the missing data packet according to the upgrade success rate. For example, the RSN presets the threshold T for OTA firmware upgrade success rate 'Rate'. When Rate<T, it indicates that the OTA update status of the network is good at this time, and it can be determined to redistribute the OTA firmware upgrade data. When Rate≥T, it indicates that the OTA update status of the network is very poor at this time, and it may be determined to respond to the request for retransmission of the missing data packets.

When redistributing the OTA firmware upgrade data, the RSN can distribute the OTA firmware upgrade data to the OTNs in the group. When responding to the request for retransmission of the missing data packets, the RSN retransmits the missing data packets to the OTNs in the group according to the priority order. For example, the OTN can issue a request for retransmission of missing data packet (Block) to the network in a multicast way (e.g., a burst retransmission request of data packet or a single retransmission request of data packet), and the RSN can quickly arbitrate the node to be upgraded with the highest priority according to the relevant parameters in the received retransmission of missing data packet request sent by the OTN, and then complete the data retransmission process by using the message defined in OTA Update Model.

When all the OTNs in Bluetooth Mesh network send requests for retransmission of missing data packets to the RSN frequently, it can cause radio frequency conflicts. In addition, the processing capacity of the RSN is limited and the cache space is limited, which can cause the RSN to be unable to process any request for retransmission of missing data packets. Therefore, it may be necessary to reasonably control each OTN to send requests for the retransmission of missing data packets through an algorithm. In particular embodiments, the priority order can be determined according to the number of missing OTA firmware upgrade data packets of the OTNs. The priority order may become higher with the fewer missing data packets. In particular embodiments, the determination of the OTN with the highest priority in the group can include the following steps.

The maximum number Lossmax of missing OTA firmware upgrade data blocks of the nodes in the network can be estimated based on the network state. When the number Loss of the missing OTA firmware upgrade data blocks of the OTN is less than 0.1 Lossmax, the priority of the OTN is set to be high. When 0.1Lossmax<Loss<0.3Lossmax, the priority of the OTN can be set to be medium. When 0.3Lossmax<Loss<0.5Lossmax, the priority of the OTN may be set to be low. When Loss>0.5 Lossmax, the priority of the OTN is set to be the lowest. It should be understood that the above only gives one example of determining the priority order, and other ways are also suitable in certain embodiments.

In particular embodiments, the process that the OTN sends the request for the retransmission of the missing data packets can include the following steps. The OTN can calculate the received signal strength indication (RSSI) that the RSN reaches itself. For example, the RSN can continuously release OTA firmware upgrade data to the network, and according to the received wireless message of the RSN, the node in the Bluetooth Mesh network can calculate the RSSI of the wireless received signal that reaches itself. Because the RSN keeps sending messages to the network, the OTN can use the sliding average filtering algorithm (e.g., the sliding window is selected according to the number of data packets, such as 10) to obtain a more accurate RSSI of the RSN.

The broadcast interval of request for the retransmission of the missing data packets of the OTN can be adjusted according to the RSSI. For example, a first RSSI threshold and a second RSSI threshold of the network can be preset, where the first RSSI threshold is larger than the second RSSI threshold. If the RSSI is not less than the second RSSI threshold and not greater than the first RSSI threshold, the broadcast interval of the request for the retransmission of missing data packets of the OTN can be the preset value. If the RSSI is greater than the first RSSI threshold, the broadcast interval of the request for the retransmission of missing data packets of the OTN can be increased (e.g., by twice the preset value). If the RSSI is less than the second RSSI threshold, the broadcast interval can be reduced (e.g., to 0.5 times the preset value). It should be understood that the preset value is a value set according to the needs of the application, and the broadcast interval set here is only one particular example, while other values can be utilized in certain embodiments.

The Bluetooth Mesh network can use the relay function to expand the transmission range of wireless messages, so there may be a problem that the OTN cannot directly receive the messages issued by the RSN, and the received messages are relayed by other OTNs. In this case, the OTN cannot directly obtain the RSSI of the message issued by the RSN. The messages in Bluetooth Mesh network are not unlimited relays. In Bluetooth Mesh network, Time To Live (TTL) can be set in messages to manage Bluetooth flooding network. Therefore, TTL is used to control the sending of retransmission request message for the OTNs that cannot directly obtain the RSSI of the message issued by the RSN. In particular embodiments, the sending of request for the retransmission of missing data packets by the OTN can include the following steps.

A TTL threshold of the Bluetooth Mesh network can be preset. If the TTL of the Bluetooth Mesh network is less than the TTL threshold, the broadcast interval of the request for the retransmission of missing data packets of the OTN can be the minimum value; otherwise, the broadcast interval is a preset value. In particular embodiments, redistributing, by the RSN, the OTA firmware upgrade data can include the following steps. When the number of OTA firmware upgrade data packets missing by the OTN is less than a preset number, the OTN can send an instruction of the request for the retransmission of missing data to the Bluetooth Mesh network every time, in order to request retransmission of one OTA firmware upgrade data packet; and the RSN may send data including a retransmitted OTA firmware upgrade packet as a response. For example, the OTN can send a message of OTA Update Missing Block Get to the Bluetooth Mesh network, which only can include a retransmission request for one OTA firmware upgrade data packet. The RSN may respond to the message of OTA Update Missing Block Status, which can include the retransmitted data of one OTA firmware upgrade packet. It should be noted that the request for retransmission of missing data instruction sends a request data index to the RSN, and the RSN sends the corresponding data to the OTN according to the data index.

When the number of OTA firmware upgrade packets missing by the OTN is greater than the preset number, the OTN can send an index message indicating the missing OTA firmware upgrade packets to the Bluetooth Mesh network, and the RSN may begin burst transmission and continuously send data including retransmission packets to the OTN as a response. In particular embodiments, the burst transmission can include the following steps.

The OTN can divide all OTA firmware upgrade data packets into groups. The RSN can judge which groups have data packets to be retransmitted by looking up the values of the groups, where the values of the groups including OTA firmware upgrade data packets to be retransmitted are represented by a first value, and the values of the groups excluding OTA firmware upgrade data packets to be retransmitted are represented by a second value. The RSN may search the OTA firmware upgrade data packets to be retransmitted in the group that can include the OTA firmware upgrade data packet to be retransmitted. The RSN can continuously send the required data to the OTN after finding all OTA firmware upgrade data packets that need to be retransmitted. For example, the OTN can request retransmission to the RSN one by one, which can lead to the network wireless congestion and the decrease of the throughput rate, so the OTN may send the message of OTA Update Missing Block Map Get to Bluetooth Mesh network, which can include two fields of a data chunk map and a data block map.

Figure 5:
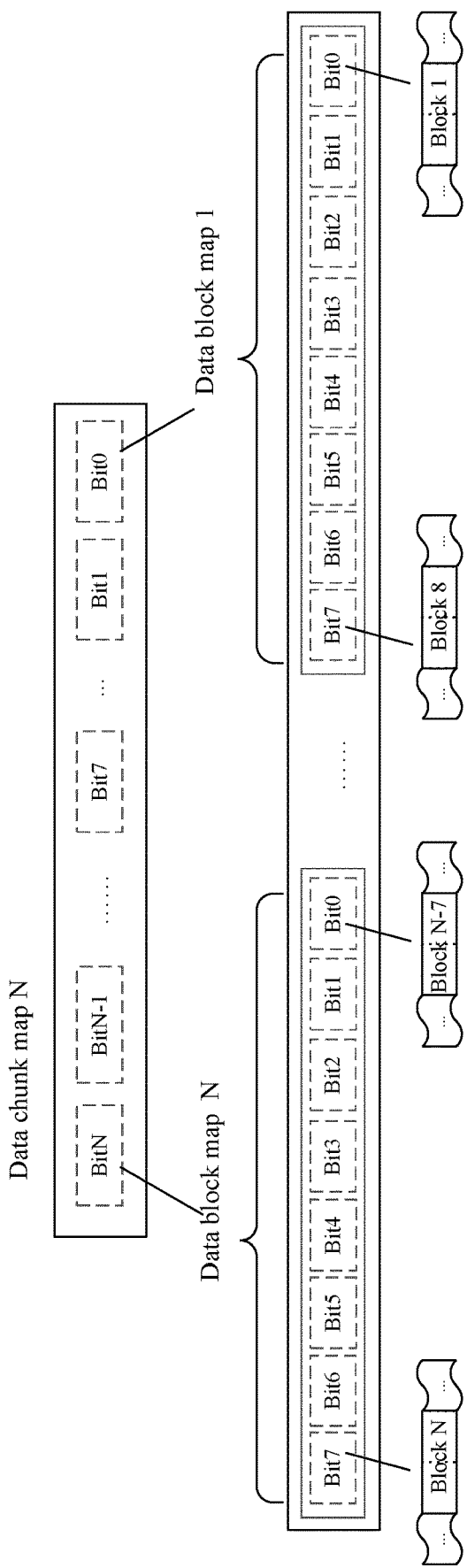
FIG. 5 is a schematic diagram of the relationship between the data chunk map and the data block map, in accordance with embodiments of the present invention.

Referring now to FIG. 5, shown is a schematic diagram of the relationship between the data chunk map and the data block map, in accordance with embodiments of the present invention. In particular embodiments, one missing data block can include eight data blocks. The RSN may respond to the message of OTA Update Generic Status, and first check the Bit values of the missing data chunk map, whereby the value of each Bit is 1 or 0 to indicate whether the data chunk can include missing data blocks. Then, the Bit values of the data block map can be checked, where the value of each Bit is 1 or 0 to indicate whether the data block needs to be retransmitted, in order to respectively determine whether the data chunk includes the missing data blocks and whether the missing data block needs to be retransmitted. Then, the RSN can begin the burst transmission and send the message of OTA Update Burst Transfer Start that represents the burst transmission time to the network. After receiving the message of OTA Update Burst Transfer Status sent by the OTN, the RSN can continuously send the message of OTA Update Missing Block Status including data of retransmitted data blocks to the OTN, and may send the message of OTA Update Burst Transfer END to the Bluetooth Mesh network after the transmission is completed. The OTN can send the message of OTA Update Burst Transfer Status including data block information of transmission failure.

In particular embodiments, the enhanced broadcast concurrent OTA firmware upgrade method based on Bluetooth Mesh can include the conversion of the OTN into the NTN (New Target Node, which refers to the target node that has completed the upgrade) after completing the OTA firmware upgrade, and the conversion of the NTN into a sub source node (SSN) after sending OTA firmware upgrade status information to the RSN, here the sub source node can be used to respond to OTA firmware upgrade requests of other nodes. When the OTN in the network receives all OTA firmware upgrade data and completes the integrity check, the application program is notified to start the upgrade process, and the node can become the NTN after the successful upgrade. When the OTN receives all the OTA firmware upgrade data and completes the integrity check, no matter whether the upgrade is completed or not, this node is called a sub source node. The sub source node has similar functions to the RSN, and it can also respond to and process OTA request messages from other nodes.

There may be hundreds of node devices in a Bluetooth Mesh network. Each node in the Bluetooth network may assume different functions, so different types of nodes may accept different downtime. For example, the lighting in the lobby can accept a longer downtime, because the loss caused by out-of-control downtime is within an acceptable range. For example, the node that controls the door lock switch can only accept a short time of downtime, and the downtime is better to be shorter, because the state of the node cannot be known at the time of the downtime, so if the door lock is open at this time, it is likely to leave an opportunity for intruders. Because the functions of nodes in Bluetooth Mesh network are different, and the working states of nodes cannot be predicted, it is a safe and reliable way to perform firmware upgrade in a background silent way. It turns over the decision-making power of the upgrade. When the node receives all the OTA firmware upgrade data, it will inform the Mesh application program internally, and the Mesh application program can choose to complete the OTA firmware upgrade operation at the right time, thus greatly reducing the risk generated during node downtime.

Finally, when the RSN redistributes the OTA firmware upgrade data or responds to the request for retransmission of missing data packet, it returns to the step S4 of FIG. 1 again, and the RSN can collect the OTA firmware upgrade status information fed back by the OTN, in order to iterate continuously until the OTA firmware upgrade requirement is met.

In this way, the enhanced broadcast concurrent OTA firmware upgrade method based on Bluetooth Mesh of particular embodiments may perform the OTA firmware upgrade for the network nodes in a silent broadcast concurrent mode, which may address the downtime risk caused by direct upgrade. This may not affect the operation of application programs, greatly reduces the risk generated during node downtime, and can quickly, safely, and reliably complete OTA firmware upgrade of all device firmware in Bluetooth SIG Mesh network. A proprietary OTA firmware update model can be established, which may define the state, role, behavior and process specification of OTA in Bluetooth Mesh network, making OTA update operation more consistent. In addition, the Model layer may have double-layer encryption of Bluetooth SIG Mesh network, which improves the security of OTA update. On the basis of OTA firmware update model, the firmware segmented update method, the retransmission request scheduling algorithm with priority, the retransmission index marking algorithm, the retransmission burst transmission method, etc., can be designed to effectively enhance the robustness and anti-interference ability of the system and improve the success rate of OTA update. On the physical layer, the payload of broadcast message can be expanded to 255 bytes. The expanded broadcast message may be compatible with the frame formats of different protocol layers of Bluetooth Mesh protocol stack and conforms to the Mesh security specification, and can also make use of the powerful characteristics of Bluetooth Mesh network without destroying the original protocol. In addition, as the payload length of a single broadcast message increases, the throughput of OTA firmware update can also be greatly improved and the interference between broadcast packets can be effectively reduced. Therefore, particular embodiments may effectively various shortcomings of other approaches, and may have a relatively high industrial utilization value.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of enhanced broadcast concurrent OTA firmware upgrade based on Bluetooth Mesh, the method comprising:
    a) creating nodes that meet preset conditions in a Bluetooth Mesh network into a group,
    b) selecting a root source node from the group, and performing OTA firmware upgrade for the root source node;
    c) distributing, by the root source node, OTA firmware upgrade data packets to target nodes that have not completed the upgrade in the group, based on an extended broadcast message;
    d) obtaining, by the root source node, OTA firmware upgrade status information of the target nodes in the group;
    e) determining, by the root source node, whether to redistribute the OTA firmware upgrade data packets or respond to a request for retransmission of missing data packets, based on the OTA firmware upgrade status information; and
    f) wherein when a number of OTA firmware upgrade data packets missing by the target node is greater than a preset number, the target node sends a message indicating one or more indexes of the missing OTA firmware upgrade data packets to the Bluetooth Mesh network, and the root source node starts a burst transmission and continuously sends data comprising retransmission packets to the target node as a response.

2. The method of claim 1, wherein the root source node is connected directly with all other nodes of the Bluetooth Mesh network.

3. The method of claim 1, wherein:
    a) when the OTA firmware upgrade data is determined to need to be redistributed, the root source node distributes the OTA firmware upgrade data packets to all nodes in the group; and
    b) when the request for retransmission of the missing data packets is determined to have been received, the root node retransmits the missing data packets to the target nodes that have not completed the upgrade in the group according to a priority order.

4. The method of claim 3, wherein the priority order is determined according to the number of the missing data packets for the OTA firmware upgrade of the target nodes, wherein the priority order becomes higher with the fewer missing data packets.

5. The method of claim 1, wherein the creating nodes comprises adding nodes with the same manufacturer identifier to the same group address, wherein the group address adopts a multicast address or a virtual address.

6. The method of claim 1, wherein the selecting the root source node comprises performing the OTA firmware upgrade for the root source node by using a mobile terminal device.

7. The method of claim 1, wherein the selecting the root source node comprises:
    a) requesting OTA firmware upgrade data from an OTA firmware upgrade website by a preset period; and
    b) obtaining the OTA firmware upgrade data to perform the OTA firmware upgrade for the root source node.

8. The method of claim 6, wherein the mobile terminal device, as a startup node, acquires parameters of the OTA firmware upgrade for the root node, and determines whether to perform OTA firmware upgrade operation and whether to perform OTA firmware overall upgrade or OTA f firmware segmented upgrade, in accordance with a message returned by the root source node.

9. The method of claim 8, wherein the OTA firmware segmented upgrade comprises:
    a) dividing a Bluetooth Mesh firmware into a plurality of parts, wherein each part has identification information and version information; and
    b) comparing, by the startup node, the identification information and the version information of the firmware of the root source node to selectively complete partial firmware upgrade.

10. The method of claim 1, wherein the distributing comprises:
    a) issuing, by the root source node, an update start instruction to the group in a multicast mode to inform the target nodes that have not yet completed the upgrade to prepare for the upgrade;
    b) sending, by the root source node, OTA firmware upgrade data packets to the target nodes that have not complete the upgrade, and
    c) sending, by the root source node, an update end instruction when the update is completed, in order to inform the target nodes of the end of transmission.

11. The method of claim 1, wherein the OTA firmware upgrade data packet adopts a broadcast message with a physical layer expanded to 200 bytes, in order to improve throughput and shorten an upgrade time, wherein the extended broadcast message is compatible with a Bluetooth Mesh protocol.

12. The method of claim 1, wherein the obtaining comprises: sending, by the target node that has not completed the upgrade, a message containing the OTA firmware upgrade status information to the root source node after the root source node distributes the OTA firmware upgrade data packets, until the root source node sends receiving success response information to the target node that has not completed the upgrade.

13. The method of claim 12, wherein:
   a) the root source node counts the OTA firmware upgrade status information of each target node that has not completed the upgrade by a preset period; and
   b) for the target node for which the OTA firmware upgrade status information is not counted, the root source node sends an acquisition instruction to acquire the OTA firmware upgrade status information of the target node which is not counted.

14. The method of claim 1, wherein the determining comprises:
   a) obtaining, by the root source node, a current success rate of the OTA firmware upgrade according to a ratio of the number of successfully upgraded nodes in the group to the number of all nodes that perform the OTA firmware upgrade; and
   b) determining to redistribute the OTA firmware upgrade data packets or respond to the request for retransmission of missing data packets, in accordance with the success rate.

15. The method of claim 1, further comprising:
   a) calculating, by the target node that has not completed the upgrade, RSSI of the root source node; and
   b) adjusting a broadcast interval of the request for the retransmission of missing data packets of the target node that has not completed the upgrade, in accordance with the RSSI.

16. The method of claim 15, wherein:
   a) when the RSSI is not less than a second RSSI threshold and not greater than a first RSSI threshold, the broadcast interval is set to be a preset value;
   b) when the RSSI is greater than the first RSSI threshold, the broadcast interval is increased; and
   c) when the RSSI is less than the second RSSI threshold, the broadcast interval is reduced.

17. The method of claim 1, further comprising:
   a) adjusting a broadcast interval of the request for the retransmission of missing data packets of the target node that has not completed the upgrade according to a Time To Live (TTL); and
   b) wherein when the TTL is less than a TTL threshold, the broadcast interval is a minimum value, and when the TTL is not less than the TTL threshold, the broadcast interval is set to be a preset value.

18. The method of claim 1, wherein when the number of OTA firmware upgrade data packets missing by the target node is less than the preset number, the target node sends an instruction of the request for the retransmission of missing data to the Bluetooth Mesh network every time a packet is missed, in order to request retransmission of the missed OTA firmware upgrade data packet, and the root source node sends data comprising the missed OTA firmware upgrade data packet as a response.

19. The method of claim 18, wherein the burst transmission comprises:
   a) dividing, by the target node, all OTA firmware upgrade data packets into groups,
   b) judging, by the root source node, which groups have data packets to be retransmitted by looking up values of the groups, wherein the values of the groups comprising OTA firmware upgrade data packets to be retransmitted are represented by a first value, and the values of the groups excluding without OTA firmware upgrade data packets to be retransmitted are represented by a second value;
   c) retrieving the OTA firmware upgrade data packets to be retransmitted; and
   d) continuously sending, by the root source node, the required data to the target node after retrieving all OTA firmware upgrade data packets that need to be retransmitted.

20. The method of claim 1, further comprising:
   a) converting the target node that has not completed the upgrade into an upgraded target node after completing the OTA firmware upgrade; and
   b) converting the upgraded target node into a sub source node after sending, by the upgraded target node, the OTA firmware upgrade status information to the root source node, wherein the sub source node is used to respond to requests for the OTA firmware upgrade of other nodes.

* * * * *